US008768862B2

(12) United States Patent
Holzner et al.

(10) Patent No.: US 8,768,862 B2
(45) Date of Patent: Jul. 1, 2014

(54) DEVICE AND METHOD FOR THE PARTIALLY OR COMPLETELY AUTOMATIC COMMISSIONING OF PACKS

(75) Inventors: Robert Holzner, Munich (DE); Martin Hirschbichler, Kolbermoor (DE)

(73) Assignee: Krones AG, Neutraubling (DE)

( * ) Notice: Subject to any disclaimer, the term of this patent is extended or adjusted under 35 U.S.C. 154(b) by 259 days.

(21) Appl. No.: 12/952,232

(22) Filed: Nov. 23, 2010

(65) Prior Publication Data

US 2011/0125694 A1      May 26, 2011

(30) Foreign Application Priority Data

Nov. 26, 2009    (DE) .......................... 10 2009 047 187

(51) Int. Cl.
*G06F 15/18*        (2006.01)
(52) U.S. Cl.
USPC ........................................................... 706/12
(58) Field of Classification Search
USPC .............................................. 706/12, 47, 62
See application file for complete search history.

(56) References Cited

U.S. PATENT DOCUMENTS

| 5,903,464 | A  | * | 5/1999  | Stingel et al. ................. 700/215 |
| 6,425,226 | B1 | * | 7/2002  | Kirschner ........................ 53/445 |
| 7,380,651 | B2 | * | 6/2008  | Lafontaine et al. ........... 198/580 |
| 2007/0280814 | A1 | * | 12/2007 | Morency et al. .............. 414/788 |
| 2010/0158647 | A1 | * | 6/2010  | Lafontaine .................... 414/270 |

FOREIGN PATENT DOCUMENTS

| DE | 2340149 A1 | 2/1974 |
| DE | 102007011856 A1 | 9/2008 |
| EP | 1447355 A1 | 8/2004 |
| GB | 1443231 A | 7/1976 |
| WO | WO-2008107175 A1 | 9/2008 |

OTHER PUBLICATIONS

Koster et al., Design and Control of Warehouse Order Picking: a literature review, Jan. 2006, ERIM, pp. 1-33.*
Rizzi et al., Reengineering and Simulation of an RFID Manufacturing System, 2008, Springer, pp. 1-9.*
Chao et al., Safeway Designs Mixed-Product Pallets to Support Just-in-Time Deliveries, 2005, Informs, pp. 1-14.*
Yaman et al., Manufacturer's Mixed Pallet Design Problem, 2008, European Journal of Operational Research, pp. 1-23.*
Search Report for European Patent Application No. 10 18 6586 dated Mar. 8, 2011.
Michael ten Hompel, Volker, H., Negativ-Kommisionierung. Taschenlexikon Logistik. Http://logipedia.org/lexikonnegativ-kommisionierung.Stand Feb. 10, 2007 ganzes Dokument.
German Search Report for 102009047187.1, dated Aug. 25, 2010.

* cited by examiner

*Primary Examiner* — David Vincent
(74) *Attorney, Agent, or Firm* — Marshall, Gerstein & Borun LLP

(57) ABSTRACT

A method for the partially or completely automatic commissioning of packs of one or several articles, in particular beverage articles, including receiving a commissioning order for preparing a target unit which comprises a target carrier and target packs of one or several articles, holding ready a source unit which comprises a source carrier and source packs of a predetermined article, automatically determining whether the source unit is suited for negative commissioning based on the commissioning order, and if the source unit is suited for negative commissioning, use of the source unit as target unit.

14 Claims, 2 Drawing Sheets

DEVICE AND METHOD FOR THE PARTIALLY OR COMPLETELY AUTOMATIC COMMISSIONING OF PACKS

CROSS-REFERENCE TO RELATED APPLICATION

The present application claims the benefit of priority of German Application No. 102009047187.1, filed Nov. 26, 2009. The entire text of the priority application is incorporated herein by reference in its entirety.

FIELD OF THE DISCLOSURE

The disclosure relates to a device and a method for the partially or completely automatic commissioning of packs of one or several articles, in particular beverage articles.

BACKGROUND

In particular in the beverage industry, packs of one or several articles are often customer-specifically commissioned on a carrier, for example a pallet. For this, it is necessary to divide bonds of packs, in particular pallets, and to supply the packs to a pack storage. The packs stored in the pack storage can then be used for forming a target unit, i.e. for commissioning the packs on a target carrier. This procedure is referred to as commissioning and can be carried out in a completely manual, completely automated or in a partially manual and partially automated manner.

For the automation of the transfer of packs or of bonds of packs of one or several different articles to the target unit, various methods and various technologies are used. The automation of commissioning processes here often lies in the area of conflict between investment costs and commissioning performance.

Situations where a plurality of the commissioning orders to be processed comprises a high proportion of some special articles are conceivable. This can be the case, for example, if a supplier offers some very well-selling articles. In this case, the commissioning process essentially consists in removing packs from a provided bond of packs and to arrange a large quantity of them again on a target unit. Such a rearrangement of packs is not desirable in the sense of the commissioning performance.

SUMMARY OF THE DISCLOSURE

It is therefore an aspect of the present disclosure to provide a device and a method for partially or completely automatically commissioning packs of one or several articles, in particular beverage articles, which permit an increased commissioning performance, in particular for the commissioning of packs of well-selling articles.

The method according to the disclosure for partially or completely automatically commissioning packs of one or several articles, in particular beverage articles, comprises the steps of: receiving a commissioning order for preparing a target unit which comprises a target carrier and target packs of one or several articles, holding ready a source unit which comprises a source carrier and source packs of a predetermined article, automatically determining whether the source unit is suited for negative commissioning based on the commissioning order and, if the source unit is suited for negative commissioning, use of the source unit as target unit.

By automatically determining whether a source unit is suited for negative commissioning and, if this is the case, using the source unit as target unit, an increased commissioning performance is possible. If a source unit is suited for negative commissioning, it is in this case not necessary to physically transfer the packs of the predetermined article, individually or in bonds, to a target unit, as the source unit is used as target unit.

The carrier of the source unit and/or of the target unit can be in particular a pallet, a trolley, a skeleton container or any other container.

The target unit can be a bond of several different packs, in particular a mixed pallet, which is prepared with reference to specifications of one or several customer orders or to specifications of one or several orders for supporting further internal as well as external business processes, in particular distribution, mounting, repacking, assembly, commissioning, etc.

The source unit can be non-mixed. In other words, the source unit can comprise packs of exactly one article, for example exactly one beverage article.

A pack can correspond to the entirety of a packaged good and a packaging. In particular, a pack of a beverage article can correspond to a beverage and the associated packaging. A pack can also correspond to a big pack, a big pack comprising a plurality of individual packs. For example, a pack can be a beverage case with bottles which are filled with a beverage. A pack can also be a cardboard box or a shrink pack.

Negative commissioning is a method in which the source unit is depalletized or unloaded, so that the number of packs of a predetermined article remaining on the source unit corresponds to the ordered quantity of the packs of the predetermined article according to a commissioning order. The source unit thus processed by commissioning is consequently used as target unit. In other words, the carrier of the source unit is used as target carrier, and the source packs remaining after the packs have been removed are used as target packs. Optionally, further packs with different articles can then be arranged on the target unit, in particular on the target carrier.

A source unit can be suited for negative commissioning if according to the commissioning order more packs of the predetermined article must be removed from the source unit than would remain on the source unit after the removal.

Automatic determination can comprise an automatic determination of a remaining quantity, where the remaining quantity corresponds to the quantitative difference between the number of source packs on the source unit and the number of packs of the predetermined article ordered by the commissioning order.

In this case, the source unit can be suited for negative commissioning if the remaining quantity is smaller than a predetermined fraction of the number of source packs of the source unit. In other words, automatic determination can comprise an automatic determination whether the remaining quantity is smaller than a predetermined fraction of the number of source packs of the source unit. The predetermined fraction can in particular be one half (½) or one third (⅓).

As an alternative, automatic determination can also comprise an automatic determination whether the number of packs of the predetermined article ordered by the commissioning order is higher than a predetermined fraction, in particular higher than half or two thirds of the source packs of the source unit.

The use of the source unit as target unit can in particular comprise a removal of the remaining quantity of source packs from the source unit and a use of the source carrier as target carrier, and using the source packs remaining after the remaining quantity has been removed as target packs.

Several commissioning orders or commissioning tasks can be received, where the step of the automatic determination is carried out for each commissioning order. The several received commissioning orders can be associated to a predetermined period. In other words, a predetermined period in which the commissioning orders must be processed can be associated to the several received commissioning orders.

Receiving one or several commissioning orders can comprise storing the one or the several commissioning orders. A commissioning order can comprise a statement of the ordered quantity of packs of one or several articles. A commissioning order can also comprise one or several partial orders.

The method can moreover comprise a determination of the commissioning order with the smallest remaining quantity for the source unit, in particular where the source unit is used as target unit for the commissioning order with the smallest remaining quantity. In other words, the method can comprise that, based on each of the commissioning orders, it is determined whether a source unit is suited for negative commissioning, and that, if the source unit is suited for negative commissioning, the source unit is used as target unit for the commissioning order with the smallest remaining quantity.

It is also possible to hold several source units ready, the step of the automatic determination being carried out for each source unit. In particular, the step of the automatic determination can be carried out for each source unit and each commissioning order. Thereby, the complete commissioning process can be optimized.

The one or the several source units can be held ready in an external storage or on a pick-up area of a commissioning device.

If several source units are suited for negative commissioning for a commissioning order, the source unit which comprises the smallest remaining quantity for the commissioning order can be used as target unit for the commissioning order.

As an alternative or in addition to the smallest remaining quantity, a second predetermined criterion can also be used to select a source unit if several source units are suited for negative commissioning for a commissioning order. In other words, the source unit which comprises the smallest remaining quantity for the commissioning order and/or which fulfills the second predetermined criterion can be used as target unit for the commissioning order.

In other words, the disclosure provides a method for the partially or completely automatic commissioning of packs of one or several articles, in particular beverage articles, comprising the steps of: receiving several commissioning orders for preparing one or several target units which each comprise a target carrier and target packs of one or several articles, holding ready several source units which each comprise one source carrier and source packs of a predetermined article, for each of the commissioning orders and each of the source units automatically determining whether the source unit is suited for negative commissioning based on a commissioning order, and if the source unit is suited for negative commissioning, use of the source unit as target unit for the commissioning order for which the smallest remaining quantity is determined.

As an alternative or in addition to the smallest remaining quantity, a second predetermined criterion can also be used to select a commissioning order if a source unit is suited for negative commissioning for several commissioning orders. In other words, the source unit can be used as target unit for the commissioning order for which the smallest remaining quantity is determined and/or which fulfills the second predetermined criterion.

The method can moreover comprise the introduction of the packs of the source unit not used for the target unit into a pack storage. In other words, the packs of the remaining quantity can be introduced into a pack storage.

As an alternative or in addition, the packs of the source unit not used for the target unit can be arranged on a carrier. In particular, the original target carrier can be used as new source carrier. In other words, a carrier originally intended as target carrier can be used as new source carrier for the packs removed from the source unit in the course of the commissioning.

The method can moreover comprise an automatic determination whether the packs not used for the target unit can be completely or partially used for preparing a further target unit. Thereby, the commissioning process can be further optimized. In particular, the commissioning process can be optimized based on the remaining quantities. Thus, several commissioning orders can be received and several source units provided, the commissioning orders being processed based on the determined remaining quantities, in particular in a sequence.

The above-described steps can be carried out automatically. In other words, the steps of the method can be completely or partially carried out by a control element, in particular a software module.

The disclosure moreover provides a computer program product, comprising one or several machine-readable media with instructions to be carried out by a computer to carry out the steps of one of the above-described methods if these are carried out on a computer.

The disclosure moreover provides a device for the partially or completely automated commissioning of packs of one or several articles, in particular beverage articles, comprising a control element which is configured to carry out one of the above-described methods.

The device can correspond to a partially or completely automated commissioning system or be part of a completely or partially automated commissioning system.

The device can in particular comprise a pick-up area for holding ready at least one source unit, a pack storage, at least one conveying element, a sequence formation means for forming a pack sequence based on a commissioning order, and/or a target area for arranging a target unit.

The pick-up area and the target area can be connected with each other via a transport section, where the transport section in particular comprises a continuous conveyor, for example a conveyor belt.

BRIEF DESCRIPTION OF THE DRAWINGS

Further features and advantages will be described below with reference to the exemplary figures. In the drawings.

DETAILED DESCRIPTION OF THE PREFERRED EMBODIMENT

Figure 1:
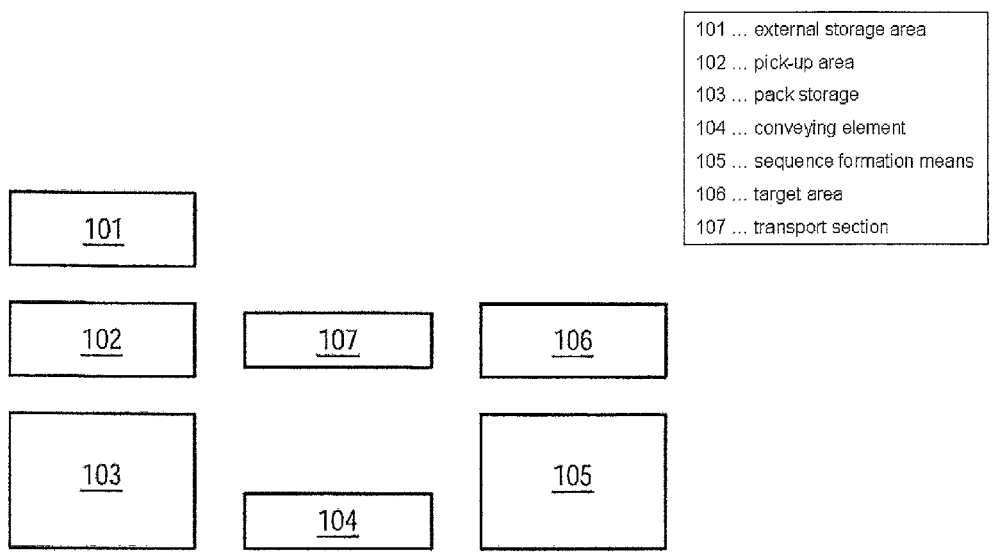
FIG. 1 shows an illustration of an exemplary device for the partially or completely automatic commissioning of packs.

FIG. 1 illustrates an exemplary system, comprising an external storage area 101 in which non-mixed source units are stored. These source units are brought into the commissioning system as feed. In the exemplary system of FIG. 1, a pick-up area 102 is shown in which one or several source units for the removal of packs arranged on these can be arranged.

One way is to transport the source units into the area 102 by conveying means. Another way is to divide the source units into individual packs or into bonds of packs and to transport them into the pick-up area 102. For this way, the packs or bonds of packs are on the one hand transported and on the other hand buffered until they are transferred to a target unit. The transfer of the packs can be accomplished in one or several steps with individual packs or bonds of packs. Here, the bonds of packs can be embodied as columns, layers or partial quantities of them.

FIG. 1 moreover shows an exemplary pack storage 103 which serves to store and/or intermediately store packs. The packs stored in the pack storage 103 can be transported, for example, via a conveying element 104 to a sequence formation means 105 which assembles partial quantities of packs of different articles and arranges them on a target unit. The target unit can be arranged in a target area 106.

The pick-up area 102 for one or several source units and the target area 106 for one or several target units are connected to each other via a transport section 107. If a source unit is to be used as target unit, a source unit arranged in the pick-up area 102 can be thereby brought into the target area 106, in particular automatically.

The conveying sections 104 and/or 107 can correspond to a continuous conveyor, in particular a conveyor belt, a chain conveyor, a live roller conveyor, a mat conveyor, or else a handling system, in particular a gantry robot or an industrial robot, or an automated transport system.

The source units can be brought from the storage area 101 into the automated commissioning process for negative commissioning. In other words, after the removal of the excessive packs from the source unit, the latter can become the target unit. This method reduces efforts and time for the transfer of packs to target units. Moreover, the packs removed in the process can be used individually or in bonds of packs for preparing other target units. The removed packs can in particular be stored in the pack storage 103.

The one or several source units which are brought from the pick-up area 102 to the target area 106 can be supplemented and/or completed by packs or bonds of packs in the target area 106 by the sequence formation means 105.

Figure 2:
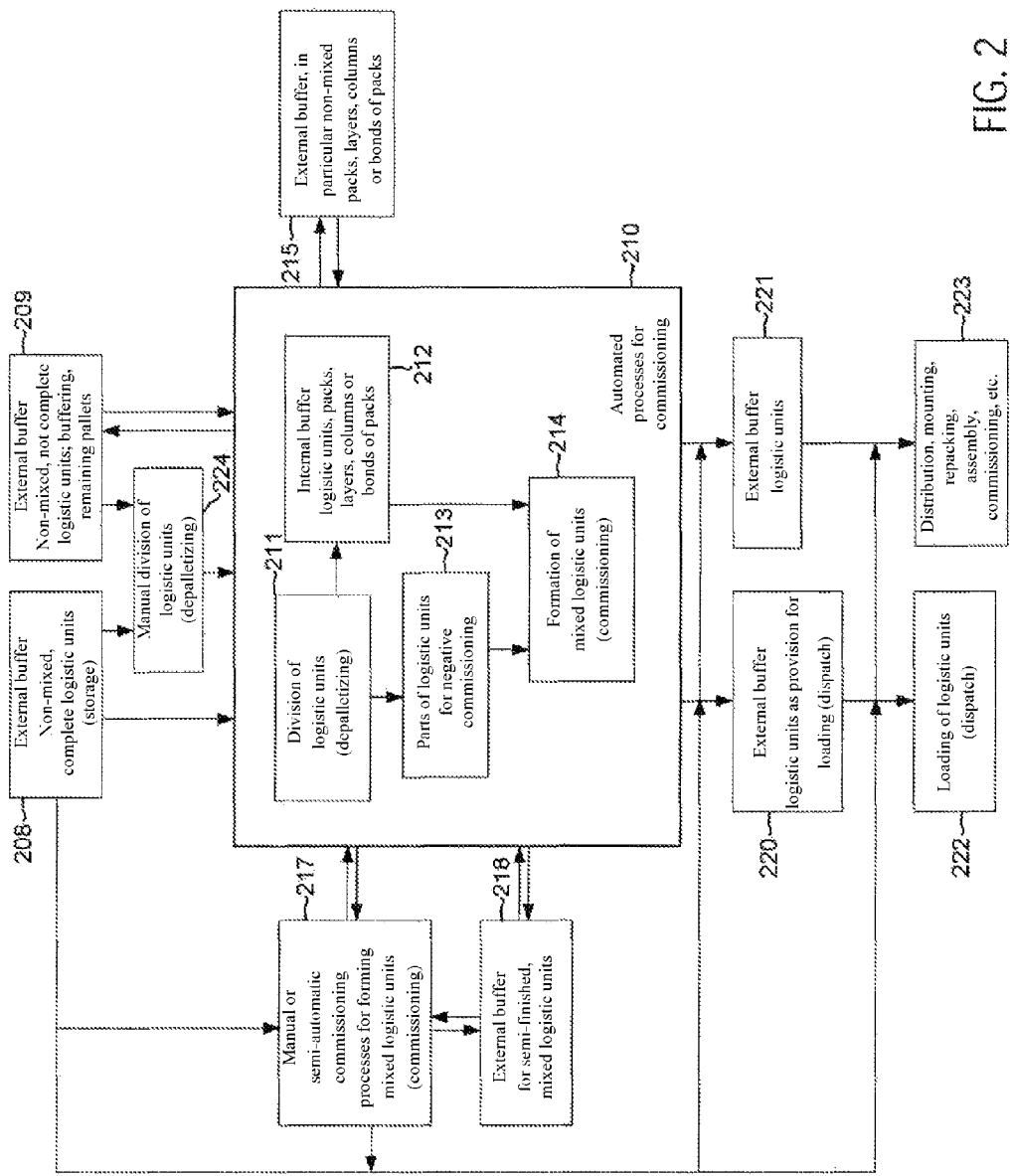
FIG. 2 shows an illustration of an exemplary method for the partially or completely automatic commissioning of packs.

FIG. 2 shows an illustration of an exemplary method for the partially or completely automatic commissioning of packs as flow chart. The central part of the flow chart is formed by the automated processes 210 for commissioning. These automated processes 210 can be carried out for example, by an all-automatic commissioning system. Around this central part, further procedure steps are illustrated which are carried out manually or at least semi-automatically.

In an external buffer or storage, non-mixed logistic units can be arranged or held ready 208, 209, as source units. A control element can determine for each of the source units whether the source unit is suited for negative commissioning, based on one or several commissioning orders. If the source pallet was found to be suited for negative commissioning, it is supplied to the automated processes 210 of commissioning, the source pallet being in particular automatically depalletized 211. As an alternative, a source pallet can also be brought first from the external buffer 208 to the commissioning system and then automatically checked by means of a control element.

The removed packs are stored in an internal buffer, for example a pack storage 212. As an alternative or in addition, the removed packs can also be stored in an external buffer or intermediately stored 209 or 215, respectively.

Source units can also be depalletized manually 224 and supplied to the automated processes 210 of commissioning.

If the source unit is suited for negative commissioning, the source unit is used as target unit 213, where further packs of different articles can be arranged on the target unit 214.

If the source unit is not suited for negative commissioning, it is either left in the external buffer or completely or proportionally depalletized for commissioning a target unit, i.e. the source packs are loaded into a pack storage. Source packs which are not brought into a pack storage are buffered externally as remaining pallets 209 or as individual packs or bonds of packs 215.

In the meantime, target units which are not yet completely formed can also be intermediately stored in an external buffer or storage and then be supplied again to the automated process for completion 218.

Source units can also be supplied to manual or semi-automatic commissioning processes 217. In the process, for example semi-finished target units can be formed 218 which are then supplied to the automated processes 210. Target units formed by the automated processes 210 can also be supplied to manual or semi-automatic commissioning processes 217.

The target units completed by manual or semi-automatic commissioning processes 217 or by automatic commissioning processes 214 are either brought to an external buffer 220, 221 or to the dispatch 222, or they are employed for supporting further internal and external business processes, in particular distribution, mounting, repacking, assembly, commissioning, etc. 223. The completed target units stored in an external buffer 220, 221 are, if required, brought to the dispatch 222 or employed for supporting further internal and external business processes, in particular distribution, mounting, repacking, assembly, commissioning, etc. 223.

It will be understood that features mentioned in the above described embodiments are not restricted to these special combinations and are also possible in any other combinations.

The invention claimed is:

1. Method for the partially or completely automatic commissioning of packs of one or several articles, in particular beverage articles, using a commissioning system, the method comprising the steps of:

receiving, by a control element of the commissioning system, a commissioning order for preparing a target unit which comprises a target carrier and target packs of one or several articles;

providing a source unit which comprises a source carrier and source packs of a predetermined article in a pick-up area of the commissioning system;

making an automatic determination, by the control element, whether the source unit is suited for negative commissioning, which requires the removal of one or more source packs, based on the commissioning order, and if the source unit is suited for negative commissioning, making use of the source unit as the target unit, the use comprising:

unloading one or more source packs from the source unit, so that the number of packs of the predetermined article remaining on the source unit matches an order quantity of the packs of the predetermined article in accordance with the commissioning order;

automatically moving the partially unloaded source unit to a target area of the commissioning system; and supplementing the partially unloaded source unit in the target area with packs or bonds of packs using a sequence formation means of the commissioning system to form the target unit.

2. Method according to claim 1, wherein making the automatic determination comprises determining a remaining quantity, wherein the remaining quantity corresponds to the difference between the number of source packs and the number of packs of the predetermined article ordered by the commissioning order.

3. Method according to claim 2, wherein the source unit is suited for negative commissioning if the remaining quantity is smaller than a predetermined fraction of the number of the source packs of the source unit.

4. Method according to claim 2, wherein using the source unit as target unit comprises:
    removing the remaining quantity from the source unit; and
    using the source carrier as target carrier and using the source pack remaining after the remaining quantity has been removed as target packs.

5. Method according to claim 1, wherein several commissioning orders are received, and wherein the step of making the automatic determination is carried out for each commissioning order.

6. Method according to claim 5, wherein the several received commissioning orders are associated to a predetermined period.

7. Method according to claim 5, the method further comprising determining the commissioning order with the smallest remaining quantity.

8. Method according to claim 1, wherein several source units are provided, and wherein the step of making the automatic determination is carried out for each source unit.

9. Method according to claim 8, wherein the source unit associated with the smallest remaining quantity for the commissioning order is used for the commissioning order as target unit.

10. Method according to claim 1, comprising introducing the packs not used for the target unit into a pack storage.

11. Method according to claim 10, comprising determining whether the packs not used for the target unit can be one of completely or partially used for preparing a further target unit.

12. Computer program product, comprising one or several machine-readable media with instructions stored thereon that can be carried out by a computer to carry out the steps of a method according to claim 1 if these instructions are carried out on a computer.

13. Device for the partially or completely automatic commissioning of packs of one or several articles, in particular beverage articles, comprising a control element which is configured to carry out the method according to claim 1, a pick-up area for one or several source units, and a target area for one or several target units, the pick-up area and the target area being connected with each other via a transport section.

14. Method according to claim 7, wherein the source unit is used as target unit for the commissioning order with the smallest remaining quantity.

* * * * *